March 15, 1955   D. R. TRINKLE   2,704,012
AUTOMATIC PROFILING MACHINE
Filed Oct. 7, 1949   9 Sheets-Sheet 1

*INVENTOR.*
DALLAS R. TRINKLE
BY H. K. Parsons & G. W. Wright,
ATTORNEYS

March 15, 1955  D. R. TRINKLE  2,704,012

AUTOMATIC PROFILING MACHINE

Filed Oct. 7, 1949  9 Sheets-Sheet 2

INVENTOR.
DALLAS R. TRINKLE
BY H. K. Parsons & C. W. Wright
ATTORNEYS

March 15, 1955 D. R. TRINKLE 2,704,012
AUTOMATIC PROFILING MACHINE
Filed Oct. 7, 1949 9 Sheets-Sheet 3

INVENTOR.
DALLAS R. TRINKLE
BY H. H. Parsons + C. W. Wright
ATTORNEYS

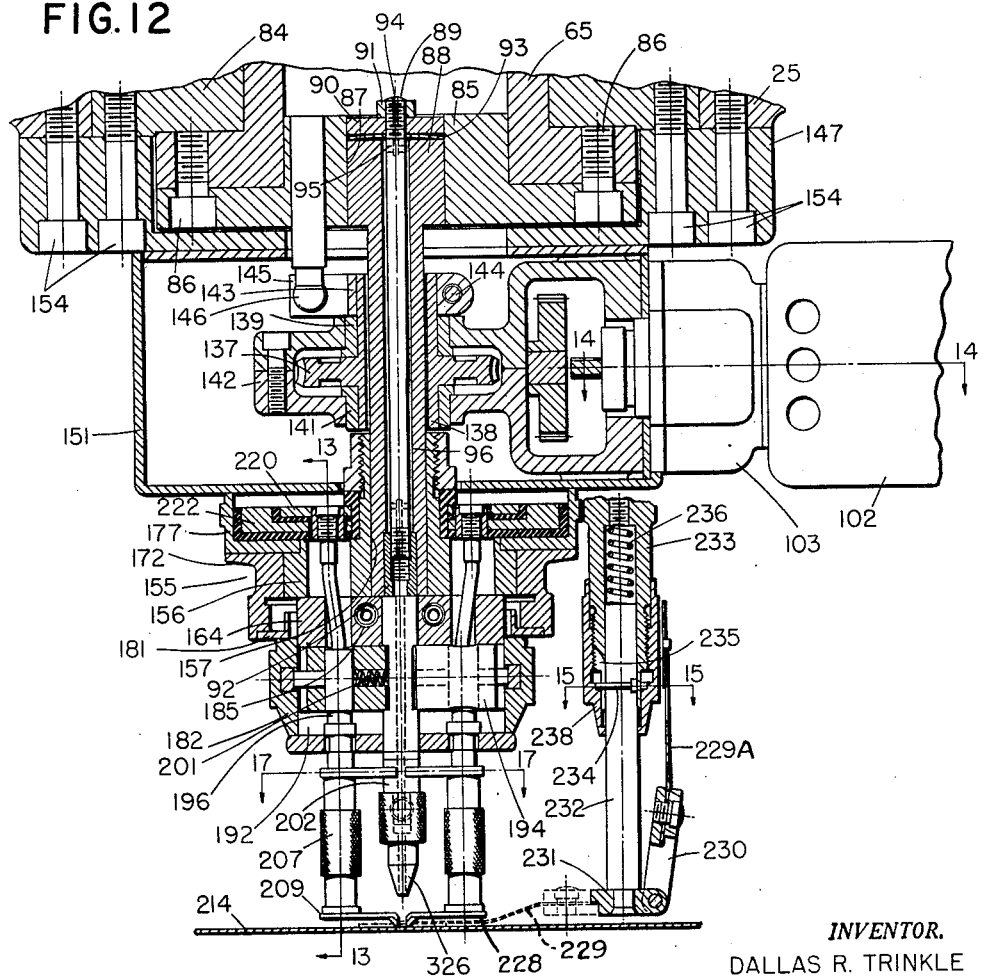

March 15, 1955  D. R. TRINKLE  2,704,012
AUTOMATIC PROFILING MACHINE
Filed Oct. 7, 1949  9 Sheets-Sheet 5
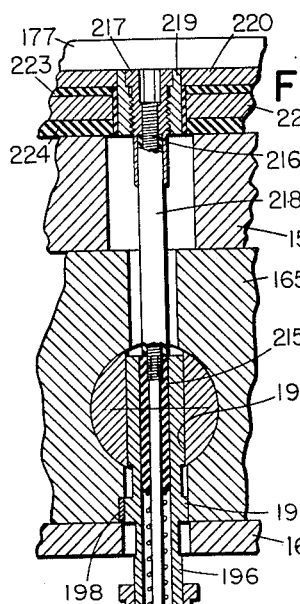
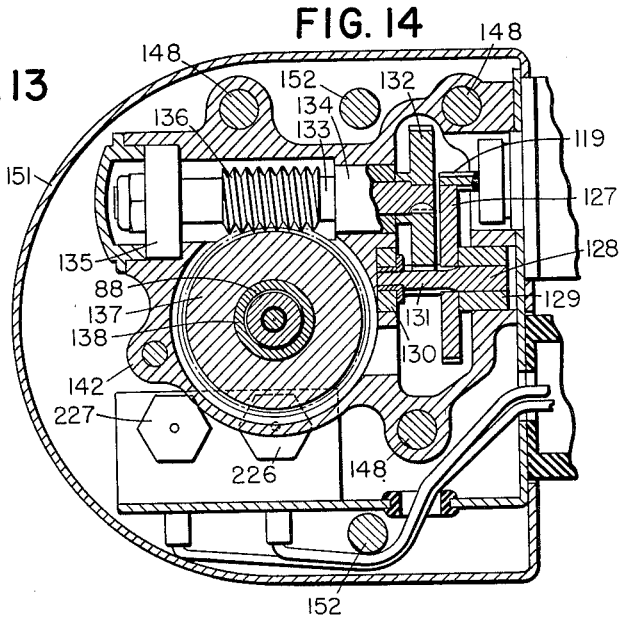
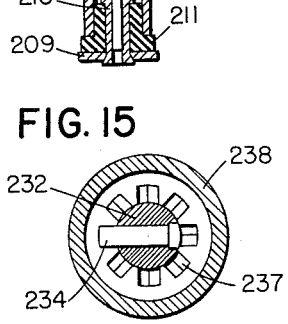
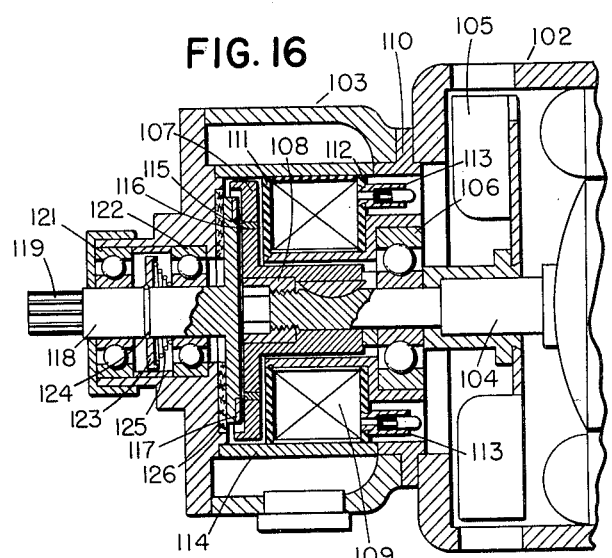
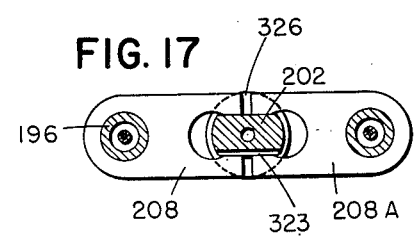
INVENTOR.
DALLAS R. TRINKLE
BY H. H. Parsons & E. W. Wright.
ATTORNEYS March 15, 1955 D. R. TRINKLE 2,704,012
AUTOMATIC PROFILING MACHINE
Filed Oct. 7, 1949 9 Sheets-Sheet 7

INVENTOR.
DALLAS R. TRINKLE
BY H. K. Parsons & C. W. Wright
ATTORNEYS

March 15, 1955  D. R. TRINKLE  2,704,012
AUTOMATIC PROFILING MACHINE
Filed Oct. 7, 1949  9 Sheets-Sheet 8
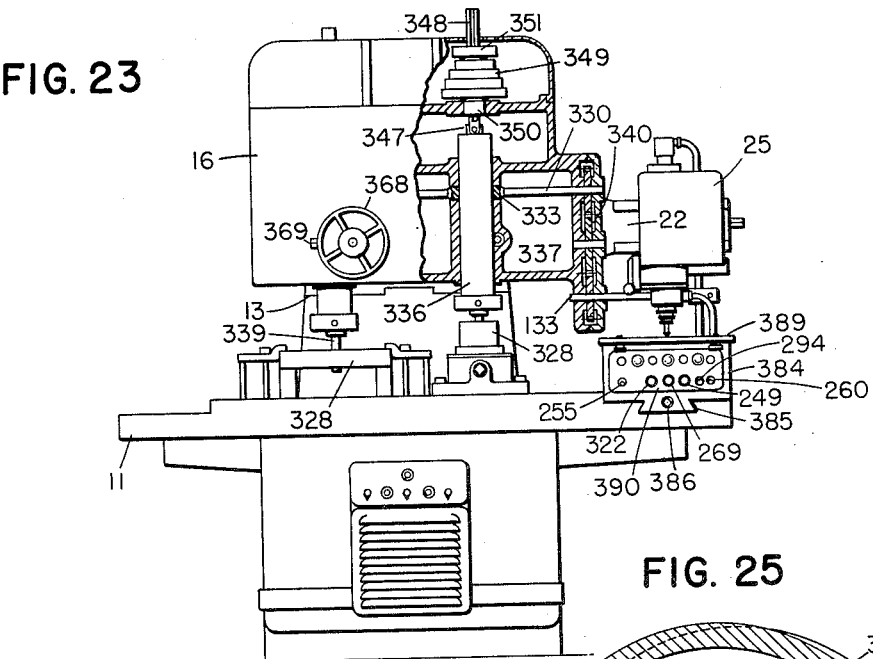
FIG. 23
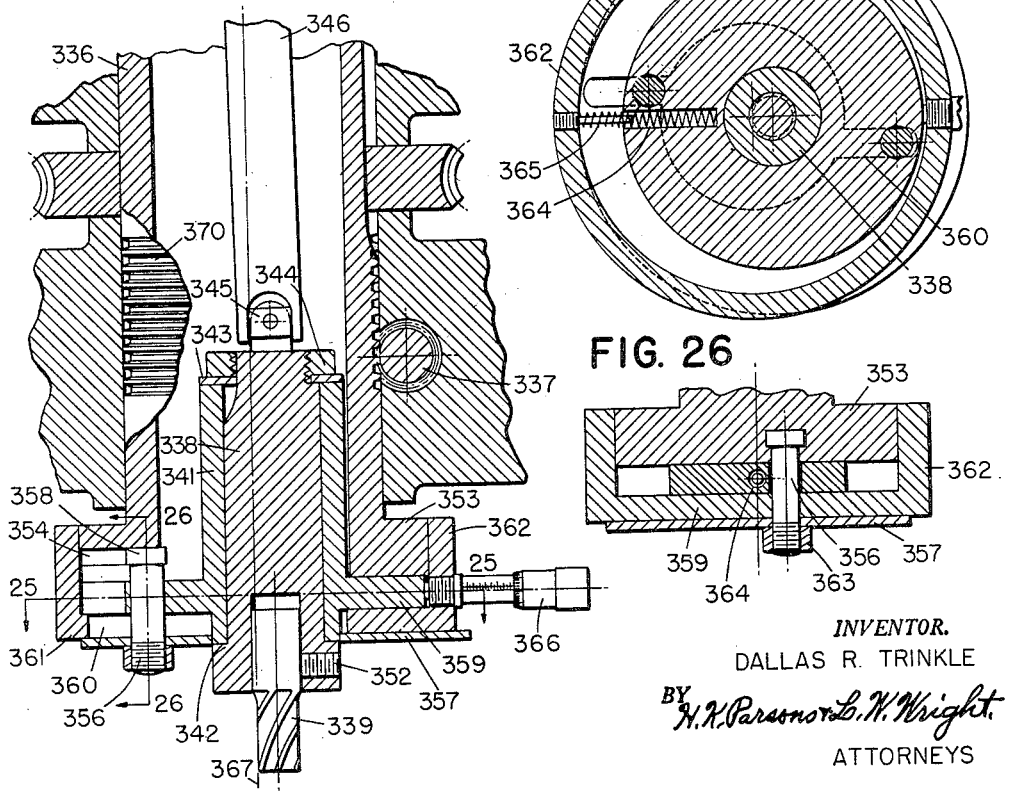
FIG. 24
FIG. 25
FIG. 26
*INVENTOR.*
DALLAS R. TRINKLE
BY H. K. Parsons & L. W. Wright
ATTORNEYS March 15, 1955  D. R. TRINKLE  2,704,012
AUTOMATIC PROFILING MACHINE
Filed Oct. 7, 1949  9 Sheets-Sheet 9

INVENTOR.
DALLAS R. TRINKLE
BY H.K.Parsons & L.W.Wright.
ATTORNEYS

United States Patent Office 2,704,012
Patented Mar. 15, 1955

2,704,012

AUTOMATIC PROFILING MACHINE

Dallas R. Trinkle, Cincinnati, Ohio, assignor to The Cincinnati Milling Machine Co., Cincinnati, Ohio, a corporation of Ohio Application October 7, 1949, Serial No. 120,206

15 Claims. (Cl. 90—13.5)

This invention relates generally to the art of metal working and more specifically to a profiling machine that is controlled automatically by a line drawing.

One of the objects of this invention is to provide a method for accurately profiling a piece of work by making direct use of a line drawing as the controlling pattern.

Another object is to provide a method of profiling that substantially reduces the time and cost of machining the ultimate product by eliminating the need for a controlling template.

Another object of the invention is to provide a mechanism that will trace continuously and automatically for 360° around a profile drawing.

A further object is to provide a tracer that can be adjusted to anticipate the trend of the line so that the tool follows the theoretical center line of profile layout.

Another object is to provide a tracing means that can be adjusted to accommodate the width of the profile line and thereby insure maximum tracing accuracy.

Another object is the provision of a simple tracing method and mechanism for line layouts that will prevent interference with the accuracy of reproduction by the presence of the chips and lubricant that are generally associated with machining operations.

Additional objects of the invention include the provision of a structure which will eliminate the necessity for utilization of a profile line or guiding pattern dimensionally identical with the effective path of the operative surface of a cutter being employed, a structure which during a single cutting operation and by utilization of the same pattern will permit of interchangeability of cutters of varying sizes as for heavy cutting operations and production of small fillets or sharp contour changes, a structure by which exact mating male and female dies may be produced which will be correctly complementary and interfitting, and in which successive roughing and finishing cuts may be taken without change of cutter or layout and which will permit compensation for reduction in size of cutter due to sharpening operations.

These and other objects should be apparent by reference to the following specification and drawings. It is understood that modifications may be made in the exact structural details herein disclosed, within the scope of the appended claims, without departing from or exceeding the spirit of this invention.

Figures 3 to 6 inclusive are enlarged diagrammatical plan views showing the relationship of the tracer finger on profile line during successive steps in the automatic tracing procedure.

Figure 7:
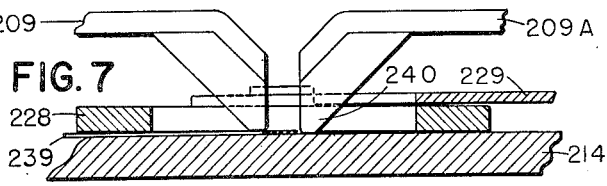

Figure 7 is an enlarged fragmentary sectional elevation showing the tracer fingers and the conducting layout.

Figure 8:
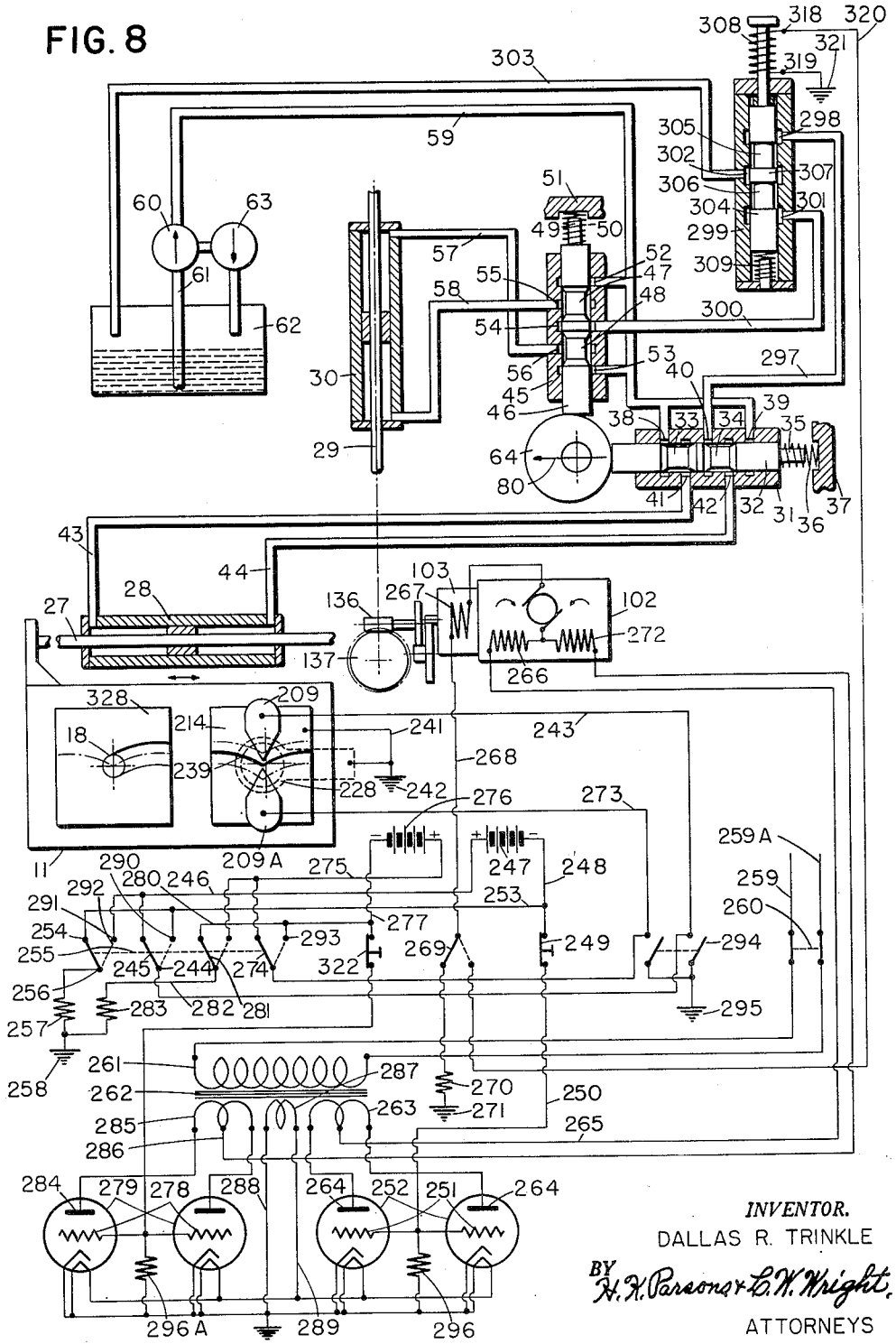

Figure 8 is a diagram of the electrical and hydraulic control circuits of the machine.

Figure 9:
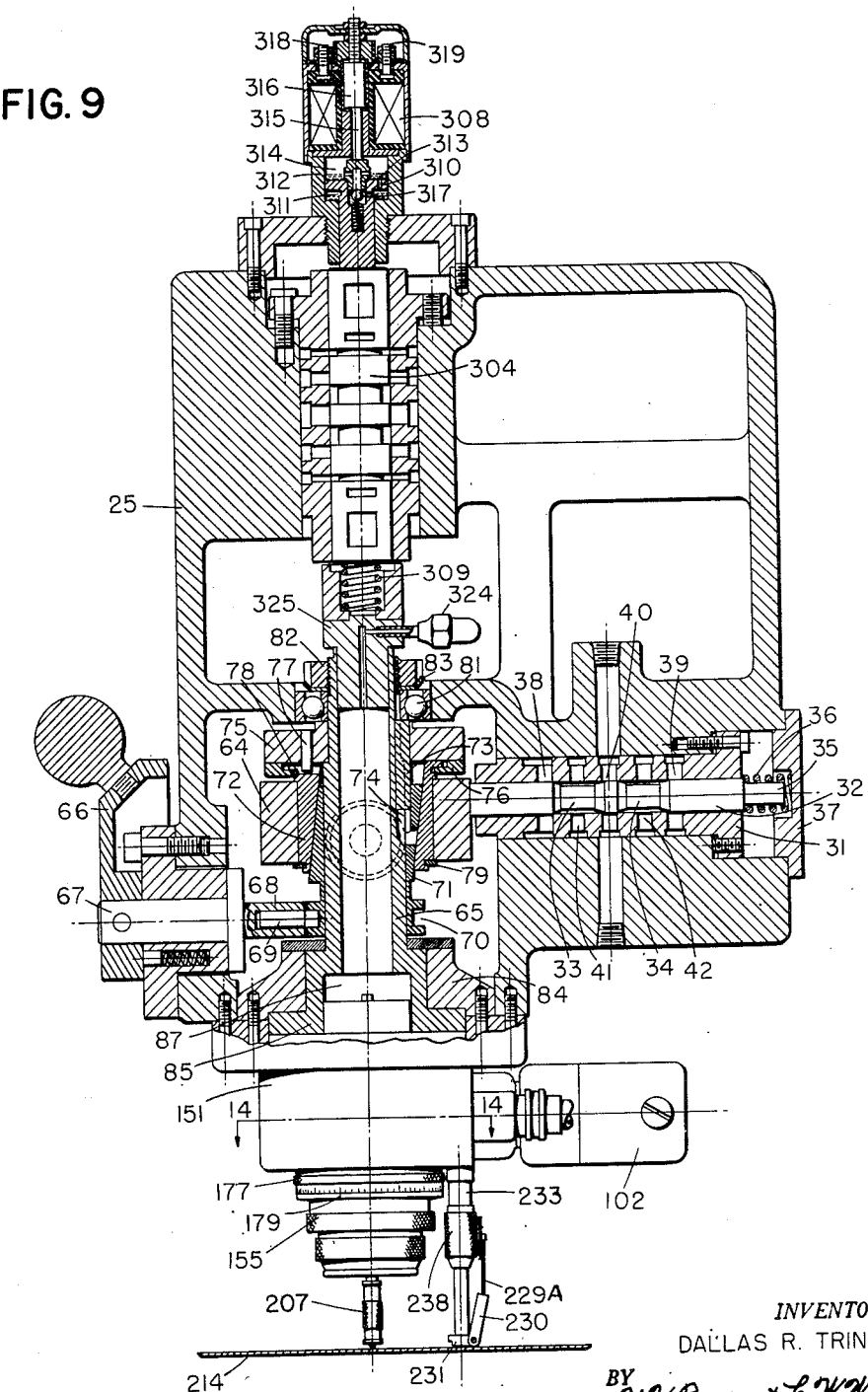

Figure 9 is a vertical section of the tracing head.

Figure 10 is an enlarged horizontal sectional view showing the tracer fingers and the pattern line contactor in operating position.

Figure 11 is a plan view of the locking device used to connect the tracer head spindle to the control cam operating spindle.

Figure 12 is a vertical section of the lower portion of the tracer head with the spindle rotated 90° from the position shown in Figure 9.

Figure 13 is an enlarged vertical section of the tracer finger sleeve and its associated contact wire viewed along the lines 13—13 of Figure 12.

Figure 14 is an enlarged horizontal section of the motor drive and associated reduction gears taken along the line 14—14 of Figure 9.

Figure 15 is an enlarged horizontal section of the line contactor adjustment lock indicated by the line 15—15 of Figure 12.

Figure 16 is an enlarged horizontal sectional view of the motor clutch.

Figure 17 is an enlarged horizontal section of the tracer finger guide sleeves viewed along the line 17—17 of Figure 12.

Figure 18:
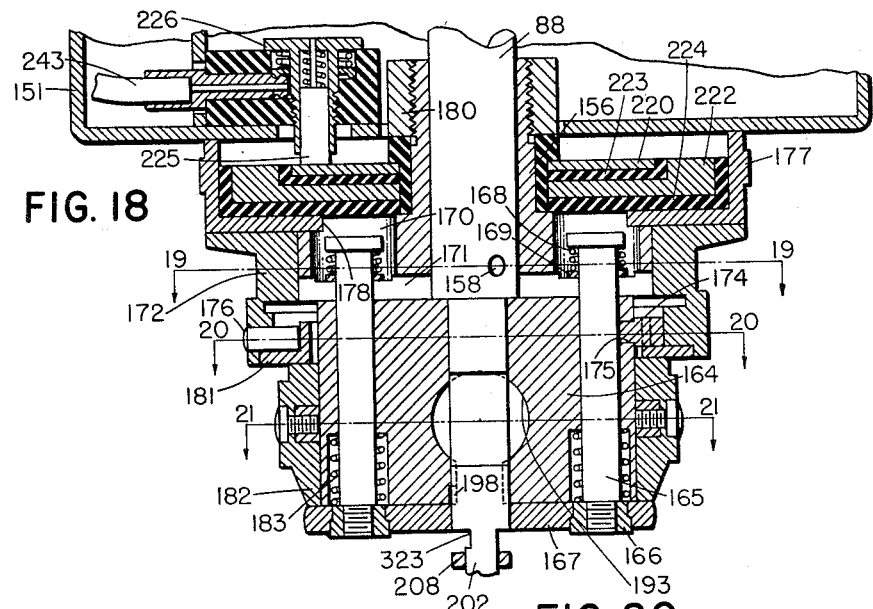

Figure 18 is an enlarged vertical section of the brush holder and tracer head taken at 90° from that shown in Figure 12.

Figures 19, 20:
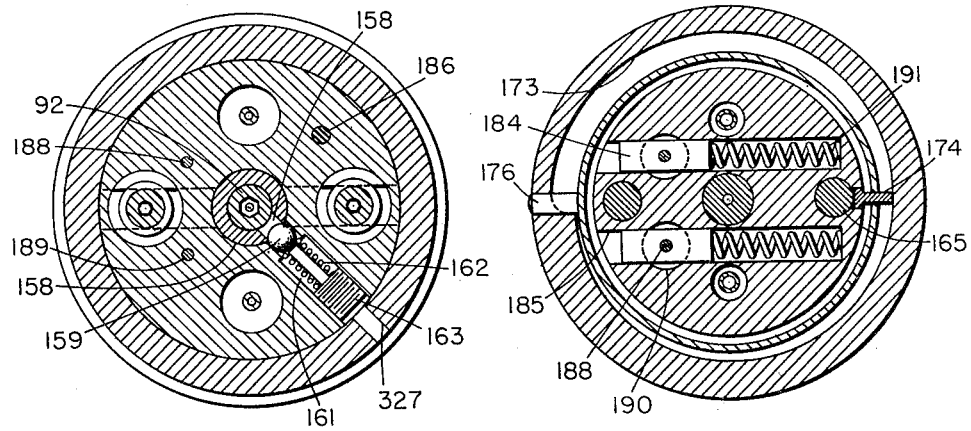

Figure 19 is a horizontal section of the attachment screw for connecting the tracer finger adjustment head to its spindle taken along the line 19—19 of Figure 18.

Figure 20 is a horizontal sectional view showing the cam for tracer finger eccentricity adjustment taken along the line 20—20 of Figure 18.

Figure 21:
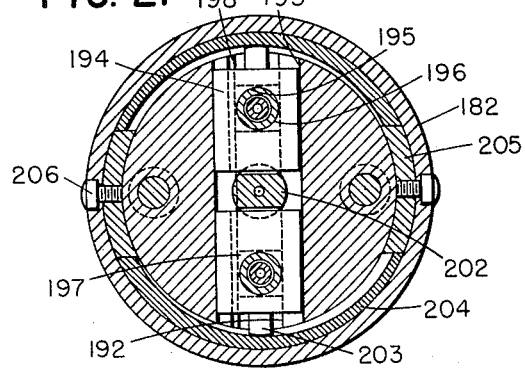

Figure 21 is a horizontal sectional view of the adjustment cam for the spacing adjustment of the tracer fingers taken along the line 21—21 of Figure 18.

Figure 22:
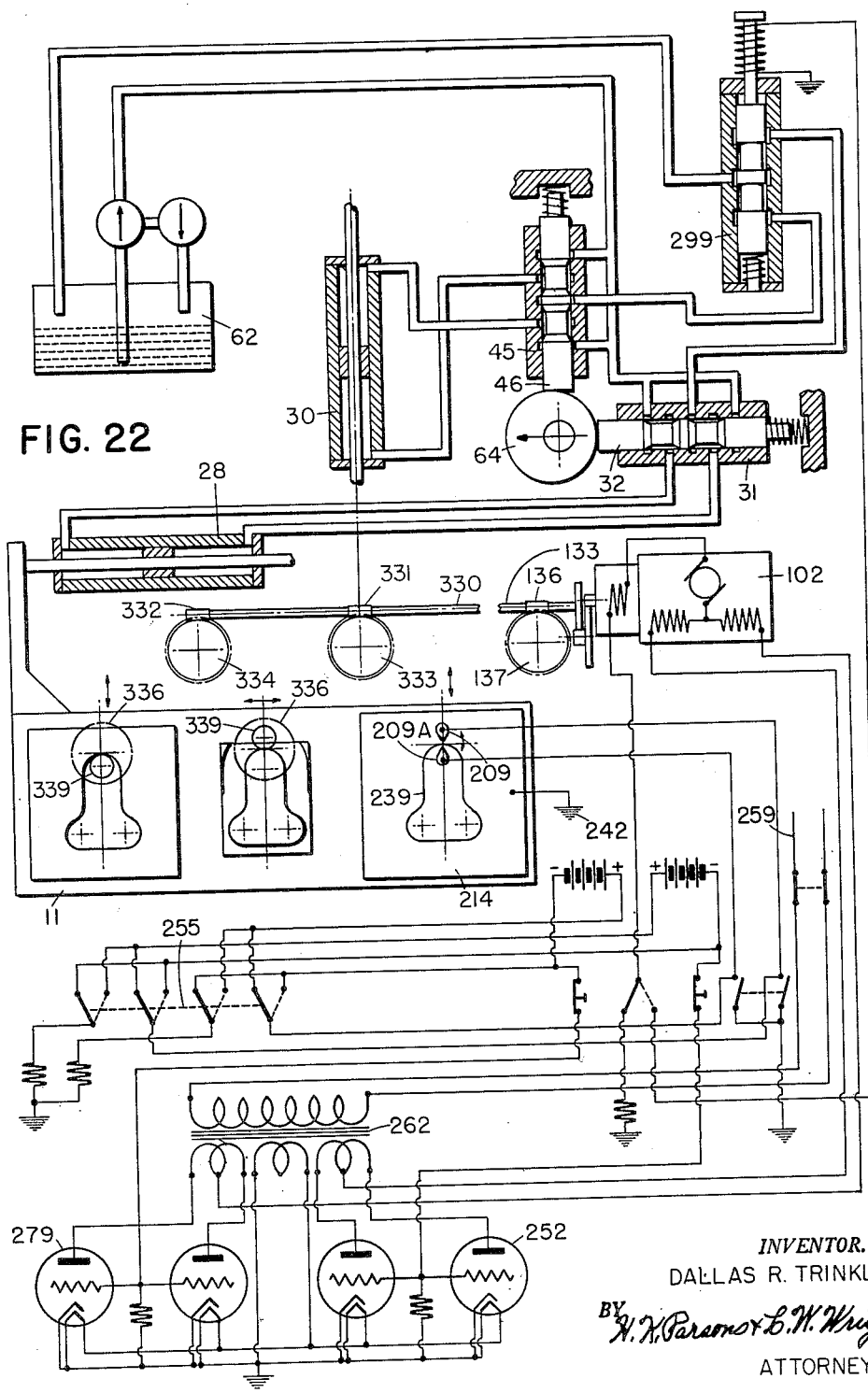

Figure 22 is a diagrammatic view showing the utilization of the present invention for control of orientation of the cutter spindles during a contouring operation.

Figure 23 is a front elevation of a machine embodying the features diagrammatically indicated in Figure 22 with parts broken away.

Figure 24 is a fragmentary vertical sectional view through one of the spindles and its supporting quill.

Figure 25 is a horizontal sectional view on the line of 25—25 of Figure 24.

Figure 26 is a fragmentary sectional view on the line 26—26 of Figure 24.

Figure 27:
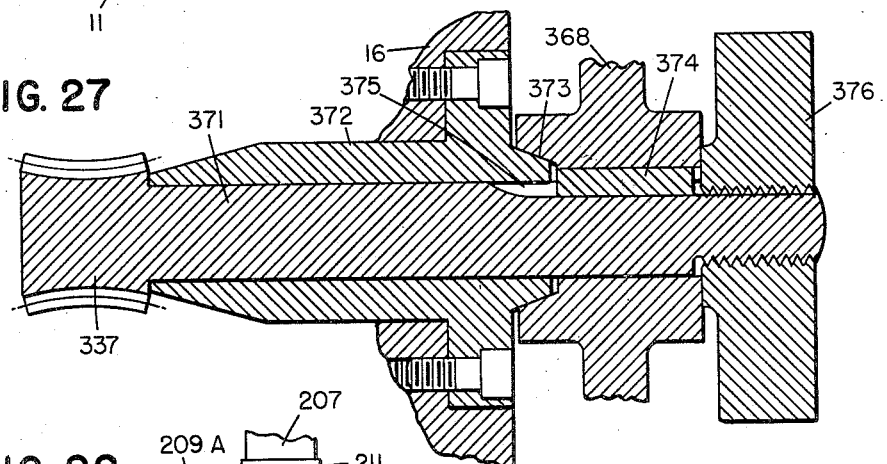

Figure 27 is a sectional view of the quill adjusting and locking mechanism.

Figure 28:
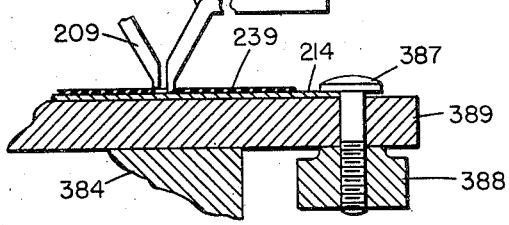

Figure 28 is a fragmentary sectional view illustrating the employment of a different form of pattern.

Figure 29:
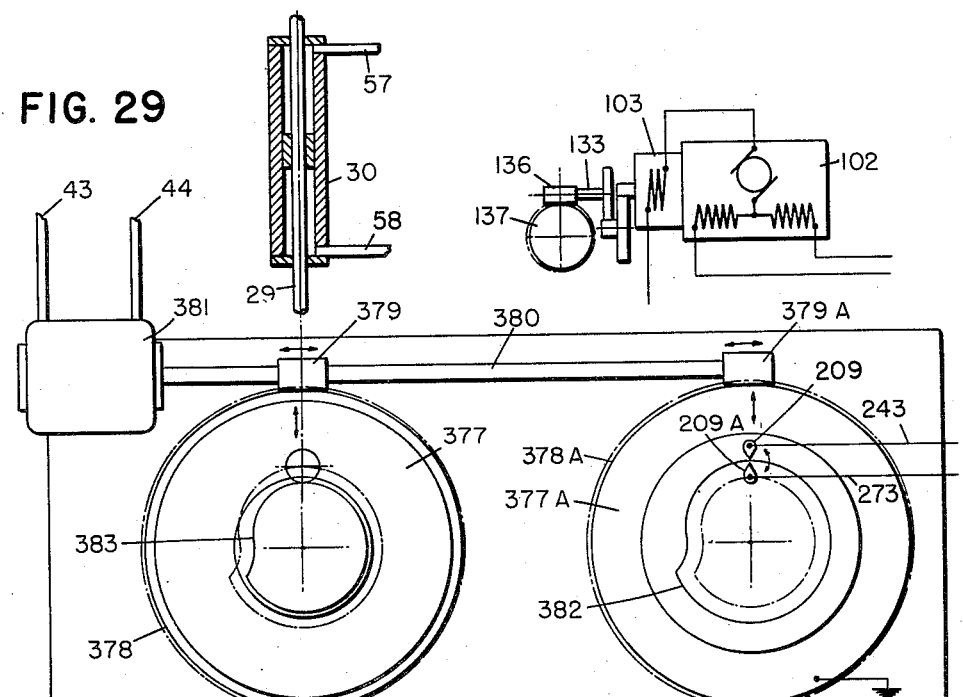

Figure 29 is a fragmentary diagrammatic view illustrating control of a rotary work supporting table.

The invention contemplates an improved method and mechanism for automatically profiling a piece of work by utilizing a profile drawing as a controlling means for moving the tool relative to the work. The profile drawing or delineation may be made on the surface of either conducting or nonconducting material, provided, however, that the line produced has opposite electrical characteristics. The line may be produced by adding a conducting ink to such material as conventional drafting paper or by applying a line of insulating lacquer to a conducting metallic sheet.

The opposing electrical characteristics between line and layout material may also be produced by applying a thin insulating film to the entire usable surface of the conducting layout material and subsequently cutting a path to provide the conducting line. Obviously, a non-conducting layout material may be coated with a conducting film and through the film a path may be cut or scribed to produce a non-conducting line.

It is contemplated that the profile layout be made by suitable drafting methods before it is placed on the machine for automatically controlling the profiling operation.

To illustrate the principles of this invention, an aluminum sheet is used for the layout material and a non-conducting lacquer is used to produce the profile line. The automatic profiling operation is generally accomplished by a pair of tracing fingers that contact the layout material on opposite sides of the line to electrically sense the change in direction of the line and to correspondingly direct the movement of the tool relative to the work.

Figure 1:
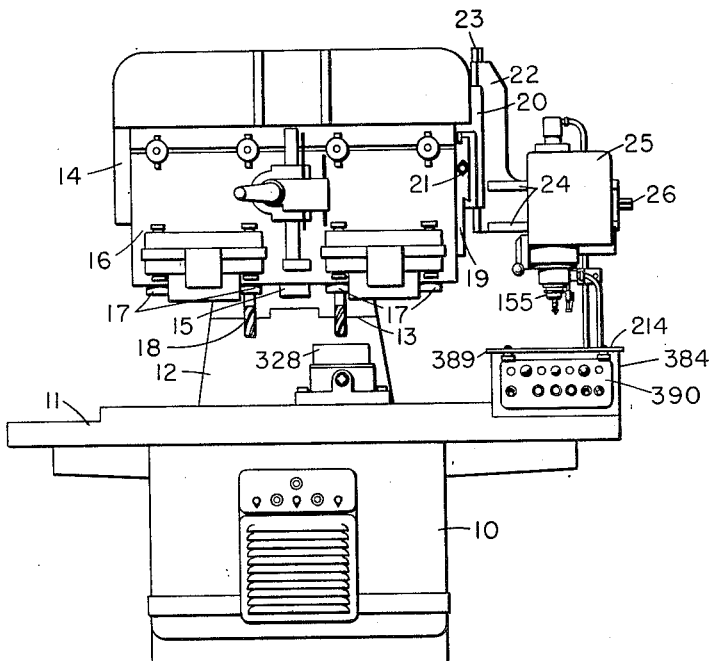
Figure 1 is the front elevation of a multiple-spindle profiling machine embodying the principles of the invention.

This invention may be embodied in a machine such as shown in Figure 1 which has been chosen as an exemplary type of machine for the purpose of explaining the principles of the invention.

In this figure the reference numeral 10 indicates the base of the machine upon which table 11 is slidably mounted for longitudinal movement of the work and profile layout. The base has a vertical column 12 at the top of which are transverse guideways 13 formed for the support of the transverse moving ram 14. Vertical guideways 15 are formed on the front face of the ram for the vertically movable spindle carrier 16. Four tool spindles 17 are provided with a suitable motor drive and adapted to receive rotary cutting tools 18 that are provided for engagement with the work.

The transverse moving ram 14 has a laterally extending bracket 19 provided with transverse guideways for engagement with the cross-slide 20 which may be transversely adjusted by lead screw 21. The cross-slide 20 in turn has vertical guideways formed therein for receiving the vertically movable bracket 22 and is provided with lead screw 23 for vertical adjustment thereof. The lateral extension of bracket 22 is provided with horizontal guideways 24 upon which is mounted the tracer head 25. Lead screw 26 provides longitudinal adjustment of tracer head 25 in a path parallel to the movement of the table 11. It should be evident from the foregoing description that the spindle carrier 16 has independent vertical adjustment on the ram 14, that the spindle carrier 16 and tracer head 25 have simultaneous transverse movement with the ram 14 and that the tracer head has independent adjustment transversely, vertically and longitudinally to facilitate the alignment of the tracing mechanism with the profile layout to be traced.

The table and ram are provided with piston and cylinder type hydraulic motors for moving them longitudinally and transversely with respect to the base 10. As diagrammatically shown in Figure 8 the table is actuated longitudinally in either direction by piston and rod 27 moving within cylinder 28 that is rigidly connected to the base 10. Likewise, ram 14 is actuated transversely in either direction by piston and rod 29 that are slidably mounted within cylinder 30 which is also connected to the base of the machine.

The rate and direction of movement of piston 27 is determined by control valve 31 having a slidable valve plunger 32. Annular grooves 33 and 34 are formed near the center portion of the plunger and tenon 35 is provided at one end for cooperation with the spring 36 that is supported by section 37 of the tracer head 25. The control valve 31 is provided with pressure ports 38 and 39 located on the opposite sides of the central exhaust port 40. The valve also has a pair of motor ports 41 and 42 which are connected by channels 43 and 44 to opposite ends of the cylinder 28. Likewise, the rate and direction of movement of piston rod 29 is determined by control valve 45 having a slidable plunger 46. The annular grooves 47 and 48 are formed near the center portion of the plunger and the tenon 49 is provided at the upper end for cooperation with spring 50 supported by the section 51 of the tracer head. Control valve 45 is provided with pressure ports 52 and 53 located on opposite sides of the central exhaust port 54. The valve has a pair of motor ports 55 and 56 which are connected by channels 57 and 58 to the opposite ends of cylinder 30.

The pressure ports 38, 39, 52, and 53 are connected by channel 59 to the motor driven supply pump 60. The pump 60 has a supply line 61 to the fluid in the reservoir 62. A relief valve 63 provides a means of pressure control for the hydraulic system. The valve plungers 32 and 46 are continuously spring-urged into engagement with the periphery of a control cam 64 by springs 36 and 50.

As shown in Figure 9, the cylindrical control cam 64 is mounted for rotation with the spindle 65 so that in the neutral or non-feeding position the two revolve concentrically together. However, the direction and rate of feed for the table 11 and the ram 14 are selectively controlled by moving the cam 64 radially outward in a fixed path so as to produce the desired eccentricity for movement of the valve plungers 32 and 46 as the spindle 65 is revolved on its axis.

The radial adjustment of the control cam 64 is generally accomplished by rotation of the adjustment segment 66 which is doweled to the shaft 67, having an eccentric sleeve 68 that carries a pin 69. The pin 69 has a flatted head for movable engagement in the groove 70 of sleeve 71 and the bore of the sleeve is slidably mounted on spindle 65. The upper portion of sleeve 71 is cylindrical in shape but has the axis of the external portion tilted at an angle with respect to the axis of the bore. Sleeve 72 has a bore with a misaligned axis mating with the upper portion of sleeve 71 so that when the latter is moved to its uppermost position the bore of 71 and the outside periphery of 72 are concentric. The sleeve 71 is prevented from rotation on the spindle 65 by the key 73 that is slidably engaged by the axially disposed keyway 74. The disc 75 is also keyed to the upper portion of spindle 65 by the key 73. Mounted on the disc 75 is the shouldered ring 76 that provides slidable engagement in a radial direction for the flanged upper portion of the sleeve 72. A pin 77 located in the disc 75 is engaged in the radial slot 78 in sleeve 72. The control cam 64 is securely held onto sleeve 72 by retainer ring 79.

From the foregoing description it should be apparent that the spindle 65 can rotate freely on its axis without disturbing the eccentric adjustment of control cam 64 and that upon movement of segment 66 the cam 64 is moved from neutral or concentric position to one of desired eccentricity in a fixed radial path as controlled by the keyway 74 and key 73 as well as by the slot 78 and pin 77. In effect, the resultant movement of the cuting tool relative to the workpiece would always be in the direction indicated by the arrow 80 on the eccentrically adjusted cam and the rate of feed would be proportional to the amount of that radial adjustment.

It is the function of the tracing mechanism herein disclosed to electrically sense the trend of the profile layout line and to correspondingly determine the directional characteristic of the feed control mechanism or, in other words, provide orientation of its directional characteristic by the use of a line pattern.

The spindle 65 has a suitable friction-reducing bearing 81 at its upper extremity that is secured in place by lock nut 82 and lock washer 83 and has a sleeve type bearing at its lower extremity carried in bushing 84.

As shown in Figure 12 an adapter plate 85 is mounted on the lower flange of spindle 65 by suitable screw connections such as 86. Adapter plate 85 is provided with a central bore 87 in which the tracer head spindle 88 is adjustably mounted.

It will become obvious from the following description that it is desirable to have a means of remotely adjusting spindle 88 and correspondingly locking it in place. This is accomplished by rod 89 that is secured to the disc 90 by a threaded connection and lock nut 91. At the lower extremity the rod is provided with a cylindrical nut 92 with a broached hexagon socket, the nut fitting into a recessed bore on spindle 88. When the nut 92 is loosened on the rod, the rod may move upward through exertion of the bowed spring 93. Both the disc 90 and the spring 93 are flatted on opposite sides to fit closely within the slotted end of tracer head spindle 88 as shown in Figure 11. The disc 90 has clearance between its outside periphery and the bore 87 but the upper portion of the spindle 88 is a close movable fit in the bore. When the surface pressure is released on spring 93 the circular ends likewise retract until it is a loose running fit inside the bore. However, when the nut 92 draws the rod 89 downward, the spring 93 is flattened under the disc 90 and becomes a tight locking fit in the bore 87. By use of the above means it is obvious that nut 92 may be loosened and spindle 88 adjusted either radially or axially and subsequently locked firmly in place by tightening the nut.

In order to provide an air supply for removing dirt and chips during the tracing operation the rod 89 is provided with a small diameter hole 94 at the upper end and, opening into it, is the transversely aligned hole 95. The clearance between bore 96 and rod 89 provides a continuation of the air channel to the apertures in the bottom of the rod.

Power means for rotating the spindle 65 in response to the electrical reaction of the tracing fingers with the profile line is provided by the motor 102. As shown diagrammatically in Figure 8, the motor used to illustrate the invention is a brush type, split field, series wound, direct current motor.

After the rotational adjustment has been made to the satisfaction of the tracing fingers, it has been found desirable to prevent further angular movement of the directional cam 64. For this purpose, the motor 102 is provided with a combination magnetic clutch and brake shown in Figure 16 and generally referred to as 103.

Opposite the commutator end the armature shaft 104 is provided with ventilating fan 105 and a combination radial and end-thrust bearing 106. The clutch flange 107 is secured to the end of the motor shaft by a key and threaded nut 108. The cylindrical portion of the clutch flange is surrounded by a magnet coil 109 which is mounted on the clutch frame 110 between the insulating discs 111 and 112. The terminals 113 are riveted into the disc 112 and provided with apertures to receive the ends of the coil winding as well as the lead wires that supply electrical energy to the clutch. A cylindrical shell 114 surrounds the clutch coil to complete the magnetic circuit through the casing 110 and the flange 107. However, to improve the magnetic attraction for the clutch disc 115, a separating ring 116 of bronze or other non-ferrous material is provided in the clutch flange 107.

The clutch disc 115 is also provided with a bronze or other suitable non-ferrous facing material for engagement with the adjacent face of the clutch flange 107. The clutch disc 115 has a shaft 118 and the inserted pinion 119. The shaft 118 has a free moving fit in the inner races of the ball bearings 121 and 122. The spring retainer disc 123 is held by the ring 124 on the shaft 118. A helical spring 125 is compressed between the retainer disc 123 and the adjacent face of the inner race of the bearing 122. When the clutch is disengaged this spring action firmly presses the face of the clutch disc against the cork insert 126 to provide the desired braking action.

The bearings for the armature and the clutch flange are in axial alignment with the bearings for the clutch disc. When the clutch coil 109 is energized, the disc 115 is drawn axially out of engagement with the cork insert 126 and into firm contact with the clutch flange 107. In this position the clutch flange and disc can rotate freely together in either direction, thereby connecting the motor drive to the pinion 119. When the clutch magnet is de-energized, the spring 125 exerts sufficient force to pull the clutch disc out of engagement with the clutch flange and again press it firmly against the cork insert 126. Since the clutch coil is energized in series with the motor armature, an interruption in the motor circuit will apply instantaneous braking action to the driving pinion and allow the motor armature to coast freely until it stops or is again energized.

Figure 14 shows the reduction gears used to transmit the drive from the motor 102 to the spindle 65. Meshed with pinion 119 is the spur gear 127 that has a shaft 128 carried in bearings 129 and 130. Integral with the shaft 128 is pinion 131 which meshes with spur gear 132. The spur gear is keyed and pressed on the shaft 133 which is carried in bearings 134 and 135. On the center portion of shaft 133 is a worm 136 which meshes with the worm gear 137.

Referring also to Figure 12 it will be obvious that the worm gear 137 carries a tubular sleeve 138 having its bearing in the bushings 139 and 141 which are firmly pressed into the housing 142. The driving lug 143 is split and clamped to the upper end of the tubular sleeve 138 by the screw 144 and has a slot 145 for engagement with the spherical tip of the pin 146 that is securely pressed into adapter plate 85.

From the foregoing, it is evident that motor rotation in either direction will, by the gears described, impart a rotational movement to the spindle 65, the adapter plate 85 and the spindle 88.

The gear housing 142 is connected to the mounting plate 147 by screws such as 148. The case 151 is likewise connected to mounting plate 147 by studs such as 152. The mounting plate 147 is suitably connected by screws such as 154 to the housing for the tracer control mechanism 25 and the bushing 84.

Connected to the lower end of spindle 88 and having suitable running clearance from the case 151 is the tracer adjustment head generally referred to as 155. The purpose of this mechanism is to properly support the two tracing fingers for independent vertical movement, to provide spacing adjustment of the fingers in a plane normal to the line and to eccentrically advance the support of the tracer fingers for proper anticipation of the trend in the profile layout. It is also the purpose of the tracer adjustment head to provide an air blast for cleaning the area of the profile line being traced and to provide electrical circuit from each tracer point to the electronic amplifiers that supply power to each respective motor field.

The tracer adjustment head 155 is generally built around the supporting member 156 which is provided with a central bore 157 as shown in Figures 12, 18, and 19. The bore has a close movable fit with the tracer head spindle 88.

Here it should be pointed out that the tracer adjustment head 155 must be angularly aligned with the spindle 65 so that the tracer fingers are maintained in a plane normal to the direction of feed. Since the tracer adjustment head 155 must be removed for servicing or to make other parts associated with spindle 88 accessible, it is necessary to provide a self-centralizing lock that will be easily removable and will, at the same time, maintain the desired angular relationship after adjustment. To accomplish this, lower end of spindle 88 is provided with a radial bore 158 that is appreciably smaller in diameter than the ball 159 as shown in Figure 19. The flanged portion of supporting member 156 is provided with a shouldered radial bore 161 that has a close movable fit with the ball 159. The ball is urged radially inward by a spring 162 to engage the bore 158 whenever the parts are moved into a position of alignment. The dog-pointed set screw 163 is tightened to securely lock the tracer head in place. The shouldered radial bore 161 is slightly staked where it enters the central bore 157 to prevent the ball from dropping out when the tracer adjustment head 155 is removed.

The cylindrical block 164 is slidably connected to the lower face of the supporting member 156 as shown in Figure 18 by a pair of threaded studs 165 that have screw connections with the nut 166 located in the plate 167. Under the heads of studs 165 are located compression springs 168 and washers 169 which bear in the bottomed holes 170 in supporting member 156. The bodies of studs 165 have a close fit in the diametrically extending cross-slot 171 which is formed in the bottom face of supporting member 156. Bodies of the studs 165 also have a close moving fit in the cylindrical block 164. From the foregoing it should be obvious that the block 164 is spring-urged upward into slidable engagement with the supporting member 156. The relationship between the studs 165 and the cross-slot 171 permits movement in a definite radial path for a limited distance from center. In order to control this movement externally and to indicate its radial position, the cam ring 172 is provided. It has a central bore in its upper portion that is a close running fit with the outside periphery of the supporting member 156. As indicated in Figure 20 the ring 172 is provided with a cam surface 173 that is arranged to engage the flatted stud 174 that is pressed into a radial bore 175 on the periphery of the cylindrical block 164. In order to limit the rotation of the cam to less than a full revolution, a stud 176 is provided to engage the stud 174. A graduated ring 177 is movably supported on a shoulder 178 of the supporting member 156. A zero marker as indicated by 179 in Figure 9 is provided on the outside periphery of the cam ring 172. When the cylindrical block is concentric to the central bore 157 of the supporting member 156 the graduated ring 177 is turned until the zero position aligns with the marker 179 on the cam ring 172 and is secured in that position by lock nut 180. A dowel pin 186 made of non-conducting material extends from a hole in supporting member 156 through the commutator discs to prevent their rotation with respect to member 156 during the movement of graduated ring 177. The cam surface 173 is constructed so as to advance the position of the tracer fingers relative to that of the cutter in a plane that is parallel to the directional characteristic of the tracer control cam 64. The graduated ring 177 is calibrated to indicate each one-thousandth of an inch eccentric movement in the desired direction between the cylindrical block 164 and the supporting member 156.

The cover ring 181 fits in a recessed bore in the lower portion of the cam ring 172. The cover ring has a vertically extending sleeve that is slotted to go over the flatted stud 174 so that the cover ring 181 does not rotate with the cam ring 172. The central bore of the tracer adjustment ring 182 has a close running fit with the periphery of the cylindrical block 164. The vertical height of the cam ring 172 and its associated cover ring 181 plus the height of the tracer adjustment ring 182 represents a distance slightly greater than that from the bottom face of the graduated ring 177 to the bottom face of the cylindrical block 164. The cylindrical block 164 is urged into frictional engagement with the supporting member 156 by the opposing action of the compression springs 168 and 183. The springs 168 also maintain frictional engagement between the cam ring 172, the cover ring 181 and the adjustment ring 182 through action of the plate 167. Since the cover ring 181 cannot revolve, either ring can be rotated independently without disturbing the angular position of the other and the spring pressure exerted axially upon them will maintain the desired adjustment.

In order to urge the cylindrical block 164 and the cam stud 165 radially outward against the cam surface 173, spring plungers 184 are provided. The plungers have a free moving fit in a pair of parallel bores 185 in the cylindrical block 164 as shown in Figures 12 and 20. A pair of pins 188 is held in the radial bore of the spring plungers 184 and have a corresponding relationship with a pair of holes 189 in the bottom face of the supporting member 156. The bores 190 provide sufficient clearance for the pins 188 to move the desired amount in either direction from cutter. Since the spring plungers 184 are held in a fixed position relative to the supporting member 156 the springs 191 urge the cylindrical block radially outward and force the cam stud 174 into yieldable contact with the cam ring 173.

As shown in Figures 12, 13, 18, and 21, the cylindrical block 164 has a diametrically extending cross-slot 192 which opens into a radial bore 193.

A pair of plungers 194 has a close sliding fit in the bore 193. Each plunger has a radial bore 195 into which is secured a vertical shaft 196. The shaft has a square portion generally indicated at 197 one face of which bears against the diametrically extending cross-slot 192 and the opposite face is frictionally engaged by a flat leaf spring 198. The flat leaf spring is held in a recessed portion of the diametrically extending cross-slot 192 and extends throughout the length of the slot. It is bowed slightly away from the slot at each end to produce a resilient pressure against the adjacent face of the vertical shaft 196.

The plungers 194 have compression springs 201 that bear against the opposite flatted sides of a guide shaft 202 to hold the cam studs 203 against the inner faces of the cam segments 204. As will be apparent from Figures 12, 18, and 21, the cam segments 204 are set into a deep groove in the adjustment ring 182. The adjustment ring can be rotated in either direction until the movement is terminated by the abutment of the cam studs 203 against the blocking segments 205. The segments 204 and 205 are held into the groove of adjustment ring 182 by screws 206.

As is shown in Figure 13, each vertical shaft 196 is provided with a sleeve 207.

The upper end of the sleeve 207 has an inwardly extending fork 208, Figure 17, that has a close sliding fit with the flatted sides of guide shaft 202, which prevents the sleeve 207 from rotating on its shaft 196. Tracer finger 209 is mounted by tubular rivet 210 to the insulating bushing 211, which, in turn, is pressed in the bore of sleeve 207. A guide rod 212 has a free sliding fit in the bore of tubular rivet 210 and is provided with a compression spring 213 that urges guide sleeve 207 downward, causing the tracing fingers 209 and 209A to contact with the layout material 214. The compression springs 213 are out of electrical contact with the bore of vertical shaft 196. Rod 212 is pressed into an insulating sleeve 215 that has a movable fit in the upper bore of vertical shaft 196. Suitable electrical connection to the guide rod 212 is provided by a spring lead wire 216 that is secured to the terminal socket 217 and insulated by sleeve 218. The terminal socket 217 is threaded into the sleeve 219 which is in electrical communication with the commutator disc 220 as indicated at the left in Figure 12 and shown in detail in the large sectional view, Figure 13. The structure at the right corresponds in all respects with that just described, with the exception that the sleeve 221 as shown at the right in Figure 12 is electrically coupled with the commutator disc 222. As indicated, suitable insulation as at 223 electrically separates the commutator discs 220 and 222, while similar insulating medium as indicated at 224 insulates the discs from the remainder of the tracer head.

To permit a complete 360 degree rotation of the tracer head with respect to its support, while maintaining the electrical contact with the respective tracer elements, use is made of a suitable spring-pressed contact member or carbon brush 225 for each of the commutator discs 220 and 222 for completion of the respective circuits as hereinafter described. The location of the respective brush holders 226 and 227 is indicated in Figure 14.

In a case where the line is a conductor and the layout material is a non-conductor, it is preferable to bring the bias ground to the line at a point near the contact with the tracer. As shown in Figures 7, 9, 10, and 12, the wiper ring 228 is carried by the leaf spring 229 which is adjustably connected to the yoke 230. Yoke 230 is pivoted to shoe 231 on the lower end of rod 232 and is connected by blade spring 229A to sleeve 238. The rod 232 is slidably supported in sleeve 233 but held against rotation by pin 234, engaged in the axial keyway 235 of sleeve 233. A spring 236 urges the rod downward, causing pin 234 to interlock with the face knurl 237 of adjusting sleeve 238, which is threaded on the supporting sleeve 233 (Figures 12 and 15). Adjustment of sleeve 238 variably limits the downward movement of the rod 232 with respect to its support while leaving the same free for yielding upward movement. The supporting sleeve 233 is carried by the case 151. As indicated in Figures 7, 10, and 12, the wiper ring or contact 228 is swung into position to overlie the layout surface 214 so that the open central portion of the ring will be centralized and in surrounding relation to the layout engaging tips 240 of the tracer fingers 209 and 209A, but out of electrical communication therewith. A ground contact will thus be made with the conducting pattern line 239 in the immediate vicinity of the contact fingers, thereby reducing line resistance.

One side of the bias circuit used for the control of the invention as disclosed may be connected to ground, either by the wiper ring 228 or by connecting the layout material directly through lead 241 and ground 242. The other side of the circuit is connected to the tracer fingers 209 and 209A. The lead 243 connects the finger 209 to the terminal 244, and the switch blade 245 and through lead 246 to the positive side of the bias power supply 247. The negative side is connected by lead 248 through the normally closed switch 249 and a lead 250 to the grids 251 of the electronic tubes 252. As shown, a pair of these tubes is coupled for full wave rectification.

In the instance shown, the layout is of conducting material and the line 239 is an insulating material. In this case, the positive side of the battery is applied to the ground and the negative side directly to the cathode. Branching from lead 248 is lead 253 that connects through terminal 254, through switch blade and terminal 256 through resistor 257 to ground at 258. The tracer finger 209, being in contact with the layout material 214, is grounded at 242. This completes a bias circuit so that the tubes 252 do not conduct. As soon as movement of either the table 11 or the transverse moving ram 14 causes the tracer finger 209 to engage the line 239 the circuit to the ground will be broken, and the bias will be removed from tubes 252, permitting them to fire. The main actuating current for the motor 102 is supplied by the power leads 259 and 259A through the main switch 260 to the primary coil 261 of transformer 262.

The secondary coil 263 is terminally connected to the plates 264 of the tubes 252 while the center top is coupled by lead 265 to the field winding 266 of the split field motor 102. Firing of the tube energizes the field winding and armature of motor 102 and the coil of clutch 103. This causes rotation of the motor to turn the spindle 65 in a clockwise direction, tending to restore the tracer tip 240 into conducting relation to the layout 214. The motor circuit is completed through the clutch coil 267, lead 268, switch 269, resistor 270, and ground connection 271.

The operative control of the tracer tip 209A corresponds with that of the tip 209 for control of the split field portion 272 of motor 102. The circuit from 209A extends through lead 273, switch blade 274, and lead 275 to the positive side of the power 276 and thence through lead 277, to the grids 278 of the electronic tubes 279. As in the case previously described, a pair of these tubes are employed for full wave rectification. Similar to the grid lead 253, the grid lead 277 is coupled through a lead 280, switch blade 281, lead 282 and resistor 283 to ground 258.

When relative movement of the pattern and tracer finger 209A is such that the pattern line 239 insulates or intercepts the contact between the tracer finger and the conducting layout 214, the grid bias of tubes 279 will be eliminated, permitting these tubes to fire. As shown, the plates 284 of the tubes are connected to the terminals of an additional secondary coil 285 of the transformer 262 while the mid-point of this secondary is coupled through lead 286 to the field 272. This will actuate the motor 102 and clutch 103 to cause counterclockwise rotation of the spindle 65 and tracer head. In this instance, also, the motor circuit is completed through the lead 268 to ground 271.

The secondary winding 287 of the transformer 262 supplies low voltage power for the filaments of tubes 252 and 279 through lead wires 288 and 289. In the case where the layout material 214 is a non-conductor and the pattern line 239 is of conducting material, it is desirable to reverse the bias circuit so that the tubes 252 and 279 will fire when the tracer points 209 and 209A engage the line, which in this instance is grounded as, for example, by employment of the wiper ring 228.

The reversal of the grid bias connections is effected by throwing the blades of the switch 255 to the dotted position, in this case thereby connecting tracer finger 209 through lead 243 and terminal 244, switch blade 245, and terminal 290 to the negative side of bias supply 247. The positive side is thereby connected by lead 246 to the terminal 291 and blade 292 to the terminal 256 and resistor 257 to the ground 258. Likewise, tracer finger 209A is connected by lead 273 through the switch blade 274 and terminal 293 to the negative side of bias power supply 276. The lead 275 and the switch blade 281 connects to ground 258 through lead 282 and resistor 283. The circuit thus established permits a bias potential to be applied to the grids 251 and 278 whenever the tracer fingers 209 and 209A are out of contact with the pattern line. As soon as contact is established by relative movement of the tracer fingers and pattern line the bias circuit is completed through a comparatively low resistance path and the tubes 252 or 279 are allowed to fire and thereby energize either the field 266 or 272 respectively.

In order that the tracer pattern effects may be neutralized or rendered inoperative when the grounded conducting layout is being employed, there has been provided the double blade switch 294 shown in Figure 8 in open position. When this switch is closed, the tracer finger or leads to 243 and 273 are coupled by the switch to ground as at 295. Under these conditions the tracer fingers individually or jointly may be raised out of contact with the conducting layout or the layout itself removed but the necessary bias is maintained on the tubes preventing activation of the motor 102.

The resistors 296 and 296A are provided to give a high resistance bleeding circuit between the control grid and the cathode of the tubes 252 and 279.

The exhaust port 40 of valve 31 is connected by fluid line 297 to the intake port 298 of blocking valve 299. Likewise, the exhaust port 54 of valve 45 is connected by line 300 to intake port 301 of the valve 299. The latter is also provided with an exhaust port 302 and exhaust line 303 that connect to the reservoir 62 for return of hydraulic fluid from the pump 60. A valve plunger 304 is provided with two grooves of reduced diameter 305 and 306 that are so arranged as to provide a passage of fluid from either intake port 298 or 301 when the spool is in the position shown in Figure 8. The central portion 307 between grooves 305 and 306 is of slightly less width than that of the exhaust port 302 so that the path of fluid is unrestricted from line 297 or 300 to the line 303.

A valve operating solenoid 308, as indicated diagrammatically in Figure 8 and shown in detail in Figure 9, is provided to electrically operate the valve plunger 304 against the resistance of spring 309 whenever the circuit is energized. As will be hereinafter disclosed, it may be desirable to retard the downward movement of plunger 304 momentarily, and for that purpose a dashpot plunger 310 is provided to cooperate with the fluid reservoir 311 in the base 312 of the solenoid valve 308. A bleeder hole 313 permits a restricted flow of fluid to the upper cavity 314 in the base 312 when the solenoid is energized and pin 315 is pushed downward by the magnet plunger 316. However, upon deenergization of the solenoid the spring 309 urges the valve plunger 304 upward and the fluid in the upper cavity 314 is again drawn into the lower cavity 311 through the bleeder hole 313 and the one-way valve provided by spring ball 317. It will be understood from the foregoing that the action upward may be appreciably faster than that downward due to the added area of the aperture provided by the spring valve. Terminals 318 and 319 are provided in top portion of the solenoid for connection between the lead 320 and ground connection 321, and when the switch 269 is in its right hand position as indicated by the dotted lines in Figure 8, the motor ground lead 268 is connected with lead 320. The motor is thus grounded through the solenoid which is therefore energized at any time when the motor is operated for adjustment of tracer finger and control cam. For occasional orientation impulses where the tracer point engages the line and one slight adjustment of cam 64 is necessary in order to change the course of table or ram travel to coincide with the trend of the pattern layout, the dampening effect of the dashpot structure will prevent such movement of the plunger as will appreciably choke off flow of the return fluid through the conduit 303. When, however, there is a more pronounced or prolonged impulse or repetition of impulses there will be a progressive shifting of the plunger 304, blocking the return or exhaust flow from the table and ram actuating motors until such time as the necessary adjustment has been made of control cam 64 to provide proper clearance between the tracer fingers 209 and 209A and the pattern line being followed. Discontinuance of the motor actuating circuit as then effected will simultaneously deenergize the solenoid when spring 309 will move the valve plunger 304 upward, unblocking the exhaust flow and permitting continued relative movement of pattern and tracer mechanism in the newly determined direction.

It is to be understood that when the changes demanded by the pattern are but gradual that switch 269 may be in the position shown in the full lines in Figure 8, and utilization of this blocking valve is unnecessary. However, when it is expected that certain sharp contours or changes of direction are to be made, the switch is then thrown into position to render the blocking valve effective to cooperate with the remainder of the mechanism in effecting the necessary pattern control reproduction.

The normally closed switch buttons 249 and 322 are provided in the bias circuits for the grids 251 and 278 so that the machine can be manually operated independent of a profile pattern. In this instance, the operator may utilize the adjustment segment 66 for manually determining the rate of movement of a table and ram and by opening either switch 249 or 322, may effect, as desired, either clockwise or counterclockwise rotation of the spindle 65 and associate parts including cam 64 to select the direction of relative movement of the pattern and tracer mechanism. This may be used, for example, in bringing the tracer fingers into proper cooperative relation with any selected portion of the pattern if initiating contour tracing.

When it is desirable to change the layout material or move the machine manually from one position to another the tracer fingers can be lifted and mechanically locked out of engagement with the layout material by utilizing the groove 323 in the guide shaft 202 as shown in Figures 12, 17, and 18 for engaging the adjacent faces of the forked portion 208 of the guide sleeve 207 and the corresponding fork 208A of guide sleeve 207A.

As heretofore discussed, adjustment ring 172 may be rotated to determine the amount of offset in an anticipating direction of the tracer fingers as respects the axis of rotation of spindle 65. This movement in a radial direction, corresponds to the direction of relative movement of tracer head and pattern as determined by the setting of the feed control cam 64. Although this adjustment may vary from a few thousandths upward, it is determined by the speed of tracing and the accuracy requirements of the part to be profiled.

When the tracer head has been moved by manual control until the tracer fingers can be dropped down into contact with the layout material on either side of the profile line, it is desirable to adjust the spacing between the points so that it is slightly greater than the width of the line. This can be most easily accomplished in setting up the machine by having the ring 182 moved to a maximum clockwise position effecting maximum separation of the contact points of the fingers 209 and 209A. The fingers then being in spanning relation to the pattern line, counterclockwise rotation of the ring will move them inward the desired amount for proper spacing according to the width of the pattern line with which they are to cooperate.

Compressed air may be supplied through line 324 and adapter 325 through the cylindrical bore of spindle 65 to the aperture in rod 89 to nozzle 326. This will serve to free the profile line of chips and particles that might otherwise interfere with the electrical characteristics of the line or the layout.

Means has been provided by lock nut 92, rod 89, disc 90, and spring 93 for adjusting the angular position of tracer head spindle 88 relative to the spindle 65. With slight pressure on the lock nut 92 and the tracer head assembled in operating position, the latter should be turned or rotated until the plane of the tracer sleeves 208 and 208A is perpendicular to the direction of relative movement between the tracer and profile layout, whereupon the tracer head may be removed by loosening set screw 163 and the lock nut 91 securely tightened and the tracer subsequently replaced for operation and locked by tightening set screw 163 again. The cam ring 172 has a radial bore 327 that provides access to the set screw 163.

Figure 3:
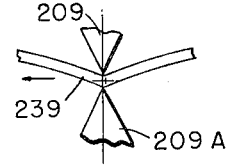

As indicated in Figure 3, the tracer points 209 and 209A slightly clear the non-conducting profile line 239 and the control cam 64 is set to produce traversing movement of the table to the right. Since both of the bias circuits through 209 and 209A are grounded, the tubes are non-conducting and the motor 102 is inactive.

Figure 2:
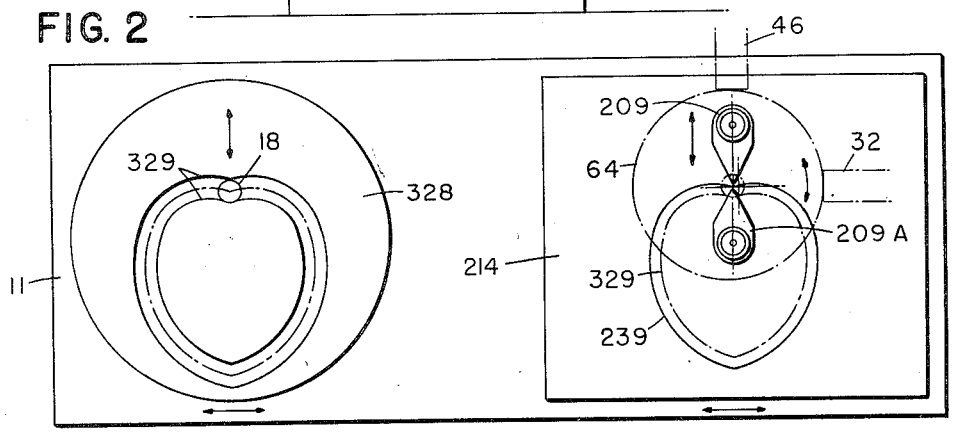
Figure 2 is a diagrammatical plan view of a profile layout and the workpiece that has been machined accordingly.
Figure 6:
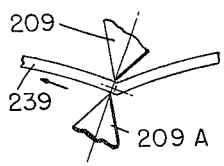
Figure 5:
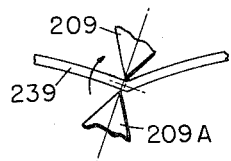
Figure 4:
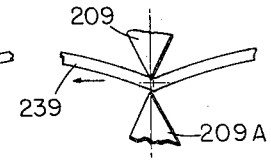

As shown in Figure 4, tracer finger 209 contacts the non-conducting layout line and the bias is removed from tubes 252 so that the field 266, and armature of motor 102 and clutch 103 are correspondingly energized to produce clockwise rotation of the control cam 64. Due to the slight adjustment as previously discussed the rotary motion will move the tracer finger 209 to the position shown in Figure 5 wherein the bias again stops the flow of current through the tubes 252 to the motor 102 and the table and ram actuation continue to produce a resultant movement between the tracer fingers and profile layout as indicated by the arrow in Figure 6. Deviations between the direction indicated by the arrow and the outline of the pattern line will cause selective engagement of finger 209 or 209A with the line to effect successive necessary reorientations of the tracing head and cam 64 so that the pattern line will be accurately and automatically followed by the machine. As the work piece 328 is mounted on the table 11 in accurate relationship to the pattern layout 214 the relative movement between the work and cutter 18 will be identical with the relative movement between the axis of the tracer head and spindle 65, and the contour of the pattern and the cam groove or like configuration 329 will therefore be reproduced on the work as indicated in connection with Figure 2.

The structure including the mechanical and electrical features and controls described in detail in connection with Figure 8 can likewise be utilized for the simultaneous production of mating parts, such as male and female die elements or the like as is indicated in connection with Figure 22, the particular distinctions in machine elements here employed being shown in detailed views, Figures 23 to 27. In this form of the invention the worm shaft 133 through the spur gear 340 drives the worm shaft 330 provided with worm portions 331 and 332 meshing respectively with the worm gears 333 and 334, which are rotatably mounted within the head 16. The bracket 22 for supporting the tracer head mechanism is preferably carried by the member 16 so that the tracer unit and spindle carrying head comprise a fixed unit so far as vertical and translatory movement relative to the table are concerned.

Vertically slidable within each of the worm gear members 333 and 334 is a quill 336 adjustable as by the cylindrical rack and pinion 337. This quill is splined in the worm gear 333 for rotation thereby and supports interiorly thereof the radially adjustable spindle 338 for the milling or like cutter 339 corresponding, for example, in form and function to the cutter 18 shown in Figure 1.

The spindle 338 has a bearing in the flanged sleeve 341 and is held axially between shoulder 342 and thrust washer 343 by lock nut 344. The upper end of spindle 338 is provided with a universal joint as at 345 which connects to the torque tube or drive rod 346 which is also provided with a universal joint 347 at its upper end. A splined shaft 348 is provided to cooperate with the step pulley 349 to impart rotation to the drive rod 346 and spindle 338. The pulley 349 is provided with radial and axial thrust bearings as at 350 and 351. Upon vertical adjustment of quill 336 and spindle 338, the spline 348 will move vertically in pulley 349.

At the lower end of the spindle 338 is a socket for suitable mounting of cutter 339 such as by clamping screw 352. The lower extremity of quill 336 has a flanged portion 353 that is provided with two T-slots such as 354 that are parallel to the plane of adjustment of sleeve 341 and determine its radial movement. A air of shouldered studs, such as 356, have heads 358 and flatted sides for engagement with the T-slots. These studs are carried by the flange 359 on the sleeve 341 and are slidable in slots 360 of the cap member 361, having the peripheral flange 362 interfitting with the flange 353 of the quill. The lower ends of the studs extend through holes in the clamp plate 357 and may be provided with nuts as at 363. As will be apparent from Figure 24, tightening of these nuts will securely clamp the flange 359 of the spindle bearing sleeve 341 between the flange 353 on the quill and the face of the cap plate, thus locking the elements in desired radially adjusted position.

For controlling this radial adjustment of the parts, the spindle flange 359 has a socket as at 364 to receive the spring 365, which at opposite ends bears against the inner face of the flange 362, urging the sleeve toward the right when the parts are in the position viewed in Figures 24 and 25.

Threaded in the flange 362 is the micrometer adjusting screw 366 bearing against the flange 359 for effecting eccentric positioning of the sleeve and spindle when the parts are unclamped. As shown in Figure 24, the sleeve 341 is near its extreme position of eccentricity toward the right, such that the face of the milling cutter 339 is in substantial registry with the axis of rotation 367 of the quill, thus corresponding in location to the position of the cutter as indicated in engagement with the left hand work piece in Figure 22. The parts being thus positioned, the rotation of the quill as effected by the motor 102 will cause the active peripheral point of the cutter to extend just up to the inner face to be produced on the female die member, which face contour will correspond to the outline of the pattern line 239 as being followed by the tracer finger 209A.

It will, of course, be evident that by adjustment of the spindle bearing sleeve 341 toward the left, as viewed in Figure 24, that the opposite face of cutter 339 may be brought into alignment with the axis 367, in which event the relationship of the cutter to the work face being produced will be that shown in the right hand of the two die elements illustrated in Figure 22.

Independent vertical adjustment of the quill is provided by the hand wheel 368 which is graduated on its outside periphery to cooperate with the zero marker 369 on the spindle carrier 16.

With reference to Figure 27, it will be obvious that the pinion 337 is machined to match the cylindrical rack 370. The shaft 371 of the pinion is carried in flanged sleeve 372 which is mounted as by screw connections to the spindle carrier 16. The hub of hand wheel 368 is provided with a tapered bore 373 which cooperates with the matching taper on the end of sleeve 372. The hub is also provided with a key 374 that cooperates with the keyway 375 of shaft 371. Upon rotation of the hand wheel 368, the pinion may be rotated in either direction for vertical adjustments of the quill 336 and upon tightening of the locking knob 376 the taper surfaces of hub and sleeve 372 are firmly gripped together and the pinion and quill are securely locked in the adjusted position, the cylindrical rack 370 permitting free rotation of the quill and associate parts under control of motor 102 while retaining the spindle against vertical movement.

From the foregoing it will be apparent that the quills, such as 336, and the tracer spindle 65 with its associated control cam and tracer head will rotate in the same direction and at the same rate in order to maintain proper relationship between tracer points 209, 209A and the cutters relative to the layout and work pieces.

The purpose of this should be readily apparent by reference to Figure 22 from which it will be seen that when the adjustment of the parts is such as to provide a relative traversing movement between the pattern and tracer element that if the left hand spindle 338 is adjusted in a negative direction it may be so positioned that its periphery will just correspond at the point of contact with the work to the position of the tracing finger 209A contacting the inner curve of the pattern 239. Since, due to the common drive for the worm gear 137 and the worm gear 334, these elements will be rotatd in syncronism, and as the spindle 338 is so set that the periphery of the cutter extends just to the axis of rotation of the quill, the cutter periphery will travel around the interior of the work for proper formation of an aperture corresponding to the shape of the pattern producing a work piece suitable for a female die element or the like.

At the same time the right hand spindle, as shown in Figure 22, is adjusted in a positive direction or outwardly so that the periphery of its cutter 339 extends substantially to the center of rotation of the worm gear 333. The synchronized rotation effected of the quill 336 will cause the periphery of the cutter to follow the same path around the periphery of the work that the tracer finger 209 follows around the outer periphery of the pattern line. Due to the fact that the transverse and longitudinal movements of pattern and work pieces are identical, the cutters follow the contour as determined by the pattern, but with a spacing regarding the surfaces of the work form determined by their eccentricity or positioning of their operative surfaces with regard to the center of rotation of the quills. Whether utilized in forming an interior or an exterior surface, the exact size of both the male and female contours produced may be accurately determined and identical but complementary contours formed on both. At the same time by suitable variations in this eccentricity, exact dimensional sizes of each may be properly determined and controlled.

Figure 29 shows a further form of the invention particularly adapted for utilization in the production of surfaces of revolution such as cams or the like. In this form of the invention, the table 11 is stationary and has rotatably supported thereon a pair of supplemental tables 377 and 377A, provided with a worm gear 378 and 378A. These worm gears mesh with worms 379 and 379A on the drive shaft 380 which is actuated by the rotary hydraulic motor 381.

The controls in this instance are the same as those particularly illustrated and described in connection with Figure 8, the distinction being that the conduits 43 and 44 extending from the valve member 31 are directly coupled with the hydraulic motor 381. Variations in the position of valve plungers 32 and 46 as determined by tracer controlled actuation of motor 102, and thus oscillation of control cam 64 regulate, as before, the back and forth movement of piston rod 29 and the ram of the machine, and at the same time the rate and direction of rotary feeding movement of the pattern and work. In this manner the contour of the pattern cam shown at 382 on table 377A will be reproduced on the work piece as indicated at 383, the drive through 380 and 381 insuring synchronous rotation of the tables 377 and 377A.

The electrical and electronic control mechanism, switches and the like for determination of operation of the machine as particularly illustrated in the diagrammatic views, Figures 8 and 22 and 29, is contained in the cabinet or housing 384 which may be suitably mounted with respect to the machine. As indicated in the drawings, it is secured to the table 11 either in fixed position or adjustable with reference to table 11 to facilitate location of the pattern with respect to the tracer as particularly shown in Figure 23. As there indicated, there is provided the dovetail slide as at 385 and adjusting screw 386 for effecting back and forth movement of the control unit.

As indicated in detail in Figure 28, the layout element 214 carrying the pattern line 239 is mounted directly on the cabinet 384 and may be provided with the contact member 387 and nut 388 for establishing proper electrical contact for the ground 241. The member 387 may also be utilized for clamping the layout plate in position on the supporting table portion 389 of the cabinet which is preferably of conducting material grounded to the remainder of the machine.

It will further be noted that the several controls for the switches, such as 249, 269, 294, 322, the general reversing switch 255, and the main operating switch 260 are carried by the control panel 390 on the front of the cabinet.

It will be understood that various forms of patterns may be employed in connection with the present invention. The platen element may be formed from either metal, paper or other material and the guiding pattern line correspondingly formed from a material having an opposite electrical characteristic. As shown in Figure 7, use is made of a conducting platen element provided with a raised pattern line of suitable insulating material which will interrupt the control circuit of one tracer or the other as it moves from the conducting platen onto the insulating line. As an alternative, however, as when a paper, composition or other platen is employed, the pattern line itself may be of conducting material and the platen a non-conductor. Likewise, as is shown in Figure 28, the platen, while of conducting material, may be overlaid with a non-conducting lacquer or the like, and the pattern line is scribed or cut through the insulation. This provides a conducting line in the nature of a very shallow groove into and out of which the fine points of the tracer contact fingers shown in Figure 28 may readily move for effecting the completions and interruptions of the respective control circuits.

Attention is further invited to the fact that while a general electrical circuit is employed completable and interruptable by way of the pattern platen and the pattern line, that this circuit, as illustrated, comprises two primary sub-divisions, one constituting the main actuating circuit including the power source, transformer elements, and circuit connections including respectively the preferably reversible direction determining motor and the solenoid or other actuator for the positive stop mechanism. The general electrical circuit also includes what may be termed an auxiliary activating circuit preferably of quite low potential to avoid any sparking action tending to damage the pattern or the tracer points and which with due safety may be grounded through the machine itself. This latter circuit primarily includes the individual tracers with their contact points, the pattern itself having the portions of distinctive electrical characteristics and the connecting wiring including a suitable source of low potential electrical energy.

It will additionally be noted that the actuating circuit for determination of directional operation of the determinator for relative direction of movement of work and cutting tool also may be employed to effect synchronous rotation of the spindle carriers or quills when utilization is made of eccentrically mounted or eccentrically positionable cutter spindles, and that this circuit may be employed either serially or in parallel to determine the movement of the stop valve.

As has been pointed out, the circuit may be so conditioned as to eliminate the operation of the feed stop or slowing down valve when following certain types of contours, while dependent on the amount of dampening provided by the dashpot mechanism, the reaction of this valve may be rendered either instantaneous or effective only on prolonged activation of the direction determinator circuit. In either case, however, it is preferred that the stop valve action be such as to provide for immediate reopening of the valve upon deenergization of the actuating circuit.

It will be further evident that different manners of reproduction of a selected pattern may be effected in utilization of the present invention. In Figure 1, the relationship of the tracer mechanism and cutter spindle axis has been indicated as so related that the axes of the several cutter spindles in contouring movement follow the center line of the pattern, this form being particularly useful in the cutting of cam or other grooves, the movement being in effect along the pitch line of the groove. When this embodiment is employed for either interior or exterior contour or shaping operations, the pattern must be laid out accordingly, due allowance being made for the effective diameter of the cutter to be employed in order that the produced work piece may be dimensionally correct.

In the form of invention particularly illustrated in Figure 22, the several cutter spindles are offset or displaced a sufficient amount to compensate, to the extent desired, either for the actual diameter of the cutter or for the diameter of the cutter plus any additional increment of stock which it is desired to leave on the surface being contoured. With this relationship of the parts, the periphery of the cutter will then follow and reproduce the contour exactly or substantially as laid out on the pattern. Dependent on the direction of offsetting of the cutter spindle axis and cutter, either cavities or peripheries may be reproduced in correspondence with the outline of the patter employed and corresponding in size thereto. This structure permits interchange of cutters during a particular contouring operation so that a large diameter cutter may be utilized for the general contour reproduction and a smaller cutter substituted as in the cutting of fillets, corners, or where sharp changes in contour are to be reproduced. There is likewise the possibility of positioning the effective periphery of the cutter rather than its axis in correspondence with the dimensional equivalent of the pattern line on the work for actual size reproduction, permitting compensation for grinding away of cutters during sharpening or permitting employment of the same cutter to take successive roughing and finishing cuts to reduce the work piece to a desired final pattern duplication, both as to size and contour.

What is claimed is:

1. In a pattern controlled machine tool having a work support and a tool support, power operable means for effecting relative movement between said supports in a manner to perform a profiling operation, the combination of a platen on one of said supports having a line drawn thereon the shape of which is to be reproduced in the work, said platen and line having different electrical characteristics, a rotatable tracer head carried by the other of said supports and having a pair of tracing contacts arranged on opposite sides of the axis of said head, means to adjust said contacts to vary the spacing therebetween, means to adjust said head to position the axis thereof in intersecting relation with said line and to position said contacts on opposite sides of said line in contact with the platen, said contacts being responsive to the different electrical characteristics of said line and platen, and means responsive to the sensing of the different electrical characteristics by said contacts for controlling operation of said power operable means.

2. In a pattern controlled machine tool having a work support and a tool support, power operable means for effecting relative movement between said supports in a manner to perform a profiling operation, the combination of a platen on one of said supports having a line drawn thereon, the shape of which is to be reproduced in the work, said platen and line having different electrical characteristics, a tracer head carried by the other of said supports, means mounting said head for rotation about an axis, a pair of tracing contacts carried by the head and oppositely laterally displaced as respects the axis of rotation of said head, means to adjust said contacts to vary the spacing thereof, and means to shift said contacts as a pair relative to the head whereby said contacts may be shifted ahead or behind the axis of rotation of the tracer head in the line of the direction of the relative feeding movement.

3. In a pattern controlled machine tool having a work support and a tool support, power operable means for effecting relative movement between said supports in a manner to perform a profiling operation, the combination of a platen on one of said supports having a line drawn thereon, the shape of which is to be reproduced in the work, said platen and line having different electrical characteristics, a tracer head having a fixed part and a rotatable part, a pair of tracing contacts arranged on opposite sides of the axis of rotation of said rotatable part, a separate electrical circuit for each contact terminating in a brush mounted in the fixed part, commutator rings carried by the movable part concentric to its axis of rotation, said rings and brushes forming a connection between said contacts and said circuit during rotation of the head.

4. In a profiling machine having a work support and a tool support, fluid operable means for effecting relative movement between said supports including rate and direction control valve means, a common rate and direction determinator operatively connected to said valve means, an electric motor for driving said determinator, a clutch for connecting said motor in driving relation to said determinator, a common throttle valve for said fluid operable means for independently decelerating or stopping said fluid operable means, an electric control circuit responsive to different electrical characteristics of a pattern, said circuit including pattern tracing means, and control means for the motor, clutch and throttle valve coupled with the circuit and responsive to circuit variations resulting from engagement of the tracing means with portions of the pattern of differing characteristics, whereby on engagement of the tracing means with a pattern of one characteristic said variations will simultaneously react through the circuit on the control means to cause energization of said motor, engagement of said clutch, and actuation of said throttle valve.

5. A reproducing machine including a work supporting element and a tracer supporting element, means mounting said parts for movement in two angularly related directions whereby any resultant relative directional movement therebetween may be effected, individual hydraulic motors for effecting the relative movements of the supports, a feed direction selector positionable to determine the relative flows as respects the hydraulic motors, an electric motor coupled with the feed direction selector for actuation and positioning thereof, independent valve means for blocking the flow of hydraulic medium as respects the hydraulic motors to limit the rate of actuation thereof, an electrically operable control for said valve means, and an electrical operating circuit coupled with the motor and with the control for said valve means for determining the operative effect of the motor and of said blocking valve means.

6. A reproducing machine including a work supporting element and a tracer supporting element, means mounting said parts for movement in two angularly related directions whereby any resultant relative directional movement therebetween may be effected, individual hydraulic motors for effecting the relative movements of the supports, a feed direction selector positionable to determine the relative flows as respects the hydraulic motors, an electric motor coupled with the feed direction selector for actuation and positioning thereof, independent valve means for blocking the flow of hydraulic medium as respects the hydraulic motors to limit the rate of actuation thereof, an electrically operable control for said valve means, and an electrical operating circuit coupled with the motor and with the control for said valve means for determining the operative effect of the motor and of said blocking valve means, said electrical circuit including tracer mechanism carried by one of the supports for cooperation with pattern means on the other of said supports.

7. A reproducing machine including a work supporting element and a tracer supporting element, means mounting said parts for movement in two angularly related directions whereby any resultant relative directional movement therebetween may be effected, individual hydraulic motors for effecting the relative movements of the supports, a feed direction selector positionable to determine the relative flows as respects the hydraulic motors, an electric motor coupled with the feed direction selector for actuation and positioning thereof, independent valve means for blocking the flow of hydraulic medium as respects the hydraulic motors to limit the rate of actuation thereof, an electrically operable control for said valve means, and an electrical operating circuit coupled with the motor and with the control for said valve means for determining the operative effect of the motor and of said blocking valve means, said circuit including a power source and manually operable means for controlling the completion of the circuit from the power source by way of the motor and inclusive or exclusive of said blocking valve means to control the positioning of the feed direction selector and the reaction of the blocking means as respects the hydraulic actuating circuit.

8. A machine tool embodying a pair of relatively movable supports, motive means for effecting movement of each of the supports and a controller for determining the individual rate of movement of each of the supports whereby a resultant path of relative movement in any selected direction may be effected, a spindle carrier mounted on one of the supports for oscillation about a fixed axis, a rotatable cutter spindle, means mounting the spindle on the carrier for radial adjustment of its axis with respect to that of the carrier whereby the axis of the spindle may be radially offset with respect to the axis of the spindle carrier, a tracer carried by one of the supports for traversing a pattern on the other support, means mounting the tracer for oscillatory movement about an axis to permit it to follow the contour of a pattern, connections between the tracer and the controller to vary the resultant path of movement of the supports in accordance with the contour of the pattern, means to maintain the axes of oscillation of the spindle carrier and tracer in fixed relation, and means to effect simultaneous synchronous oscillation of the spindle carrier and tracer about their axes, whereby during tracing the radially offset spindle will follow an orbital path offset as respects the pattern outline followed by the tracer.

9. In a machine tool including a work support and a tool support, and means for effecting relative movement of said supports in two angularly related directions, means for automatically controlling the relative movement of the supports in accordance with a pattern configuration, said means including an orientable control member movable to determine the relative rates of movement of the respective supports and thereby the resultant direction of relative movement of work support and tool support, a rotatable tracer head carried by one of the supports having tracing contact means for engagement with an electrically energized pattern member on the other of the supports, a rotatable spindle carrier mounted on the tool support, a cutter spindle supported by the carrier, means for effecting radial adjustment of the spindle with respect to its carrier, power means coupled with the orientable control member and the rotatable spindle carrier for effecting synchronized rotary orientation thereof, and an electric control circuit coupled with said tracing contact means and with said power means whereby pattern effected reactions on the tracing contact means will activate the power means to determine the orientation of the direction control member and the spindle carrier.

10. In a reproducing machine, the combination with a pair of supports, means mounting said supports for relative movement in angularly related directions, hydraulic motive means for effecting said relative movement of the supports, an orientable control member for said hydraulic actuating means shiftable to determine the resultant relative movement of said supports, an orientable pattern following tracer, a reversible electric motor coupled with the tracer and the control member for effecting joint orientation movements thereof, an electric circuit coupled with said motor selectively activatable to effect reverse rotations of the motor, pattern contactive tracer points carried by the tracer, and individual electrical control circuits coupled with the respective tracer points for separate determination of the activation of the motor circuit to effect one direction or another of motor operation, said control circuits each including an electronic tube individual to the circuit and an individual power source in the circuit connected to the tracer and to the electronic tube for effecting a tracer controlled bias of the tube.

11. In a reproducing machine, the combination with a pair of supports, means mounting said supports for relative movement in angularly related directions, hydraulic motive means for effecting said relative movement of the supports, an orientable control member for said hydraulic actuating means shiftable to determine the resultant relative movement of said supports, an orientable pattern following tracer, a reversible electric motor coupled with the tracer and the control member for effecting joint orientation movements thereof, an electric circuit coupled with said motor selectively activatable to effect reverse rotations of the motor, pattern contactive tracer points carried by the tracer, individual electrical control circuits coupled with the respective tracer points for separate determination of the activation of the motor circuit to effect one direction or another of motor operation, said control circuits each including an electronic tube individual to the circuit and an individual power source in the circuit connected to the tracer and to the electronic tube for effecting a tracer controlled bias of the tube, and means for jointly reversing the bias effects of the tubes of both circuits for a given tracer established conditioning of the circuits.

12. In a reproducing machine, the combination with a pair of supports, means mounting said supports for relative movement in angularly related directions, hydraulic motive means for effecting said relative movement of the supports, an orientable control member for said hydraulic actuating means shiftable to determine the resultant relative movement of said supports, an orientable pattern following tracer, a reversible electric motor coupled with the tracer and the control member for effecting joint orientation movements thereof, an electric circuit coupled with said motor selectively activatable to effect reverse rotations of the motor, pattern contactive tracer points carried by the tracer, individual electrical control circuits coupled with the respective tracer points for separate determination of the activation of the motor circuit to effect one direction or another of motor operation, said control circuits each including an electronic tube individual to the circuit and an individual power source in the circuit connected to the tracer and to the electronic tube for effecting a tracer controlled bias of the tube, and independent manually operable means for effecting directional actuations of the reversible motor.

13. A reproducing machine as specified in claim 5 characterized by a delay device for retarding the response of the blocking valve means to the action of the electrically operable control for said valve means.

14. A reproducing machine as specified in claim 10 characterized by a blocking valve for retarding the operation of the hydraulic motive means, and operative connections between the blocking valve and said individual electrical control circuits for operating the valve simultaneously with the activation of the motor control circuit.

15. A pattern controlled machine tool as specified in claim 5 in which one of said hydraulic motors controlled by the feed direction selector is a reciprocating hydraulic motor and the other of said hydraulic motors is a rotary hydraulic motor.

References Cited in the file of this patent

UNITED STATES PATENTS

| | | |
|---|---|---|
| 2,172,313 | Young | Sept. 5, 1939 |
| 2,226,677 | Vikhman | Dec. 31, 1940 |
| 2,283,240 | Trinkle | May 19, 1942 |
| 2,329,818 | Brackett | Sept. 21, 1943 |
| 2,331,337 | Meyer | Oct. 12, 1943 |
| 2,332,533 | Roehm | Oct. 26, 1943 |
| 2,354,391 | McCourt | July 25, 1944 |
| 2,373,332 | O'Neill | Apr. 10, 1945 |
| 2,445,041 | Scholz | July 13, 1948 |
| 2,456,158 | Tancred | Dec. 14, 1948 |
| 2,594,716 | Bailey | Apr. 29, 1952 |